United States Patent
Ichikawa

(10) Patent No.: US 9,118,211 B2
(45) Date of Patent: Aug. 25, 2015

(54) POWER SUPPLY SYSTEM, POWER-SUPPLY DEVICE AND POWER-SUPPLY METHOD

(75) Inventor: Kuniyoshi Ichikawa, Tokyo (JP)

(73) Assignee: NEXT ONE CREATE, LTD., Tokyo (JP)

( * ) Notice: Subject to any disclaimer, the term of this patent is extended or adjusted under 35 U.S.C. 154(b) by 472 days.

(21) Appl. No.: 13/470,755

(22) Filed: May 14, 2012

(65) Prior Publication Data

US 2012/0313567 A1    Dec. 13, 2012

(30) Foreign Application Priority Data

Jun. 9, 2011   (JP) .................................. 2011-129188

(51) Int. Cl.
| | |
|---|---|
| *H02J 7/00* | (2006.01) |
| *H02J 1/12* | (2006.01) |
| *H02J 3/32* | (2006.01) |
| *H02J 3/34* | (2006.01) |
| *H01M 10/44* | (2006.01) |
| *H01M 10/46* | (2006.01) |
| *H02J 7/35* | (2006.01) |
| *H02J 3/38* | (2006.01) |

(52) U.S. Cl.
CPC . *H02J 7/35* (2013.01); *H02J 3/383* (2013.01); *H01M 10/44* (2013.01); *H01M 10/46* (2013.01); *H02J 1/12* (2013.01); *H02J 3/32* (2013.01); *H02J 3/34* (2013.01); *Y02E 10/563* (2013.01); *Y02E 10/566* (2013.01)

(58) Field of Classification Search
CPC ................. H02J 7/00; H02J 1/12; H02J 3/32; H02J 3/34; H02J 7/35; H02J 7/03; H02J 3/383; H01M 10/44; H01M 10/46; Y02E 10/563; Y02E 10/566

USPC ................. 320/101, 124, 125, 130, 135, 138; 307/46, 66
See application file for complete search history.

(56) References Cited

U.S. PATENT DOCUMENTS

| | | | |
|---|---|---|---|
| 2008/0181832 A1* | 7/2008 | Shiue et al. ............... | 422/186.12 |
| 2009/0283128 A1* | 11/2009 | Zhang et al. .................. | 136/244 |
| 2010/0038974 A1 | 2/2010 | Imperial | |

(Continued)

FOREIGN PATENT DOCUMENTS

| | | | | |
|---|---|---|---|---|
| JP | 02101936 A | * | 4/1990 | ................ H02J 7/35 |
| JP | A-2002-058177 | | 2/2002 | |

(Continued)

OTHER PUBLICATIONS

Oct. 9, 2012 Office Action issued in British Patent Application No. GB1210071.5.

(Continued)

*Primary Examiner* — Phallaka Kik
(74) *Attorney, Agent, or Firm* — Oliff PLC

(57) ABSTRACT

A plurality of power-supply devices, in which power generated by solar energy is stored, are allowed to exchange power among themselves. Power generated by a solar panel connected to a first power-supply device is stored in a power storage section of the first power-supply device. Power supplied by the second power-supply device, which has a power storage section for storing power generated by the solar panel, is stored in the power storage section of first power-supply device. Power stored in the power storage section of the first power-supply device is supplied externally.

4 Claims, 2 Drawing Sheets

(56) References Cited

U.S. PATENT DOCUMENTS

| | | | |
|---|---|---|---|
| 2010/0133911 A1* | 6/2010 | Williams et al. | 307/82 |
| 2010/0241375 A1* | 9/2010 | Kumar et al. | 702/62 |
| 2011/0025267 A1* | 2/2011 | Kamen et al. | 320/109 |
| 2011/0156651 A1* | 6/2011 | Christensen | 320/128 |
| 2012/0182670 A1* | 7/2012 | Prax et al. | 361/641 |
| 2012/0281444 A1* | 11/2012 | Dent | 363/56.01 |
| 2012/0313567 A1* | 12/2012 | Ichikawa | 320/101 |
| 2013/0011704 A1* | 1/2013 | Horne et al. | 429/72 |
| 2013/0016212 A1* | 1/2013 | Laceky et al. | 348/143 |
| 2013/0118099 A1* | 5/2013 | Scanlon | 52/173.3 |
| 2014/0084687 A1* | 3/2014 | Dent | 307/26 |
| 2014/0084871 A1* | 3/2014 | Densham et al. | 320/119 |
| 2014/0183946 A1* | 7/2014 | Recker et al. | 307/23 |
| 2014/0361688 A1* | 12/2014 | Recker et al. | 315/86 |

FOREIGN PATENT DOCUMENTS

| | | | | |
|---|---|---|---|---|
| JP | A-2002-330556 | 11/2002 | | |
| JP | A 2006-174540 | 6/2006 | | |
| JP | A-2008-104284 | 5/2008 | | |
| WO | WO 2008072266 A1 * | 6/2008 | | H02J 7/00 |

OTHER PUBLICATIONS

Partial Translation of Japanese Office Action issued in Application No. 2011-129188; Dated Aug. 23, 2011.

* cited by examiner

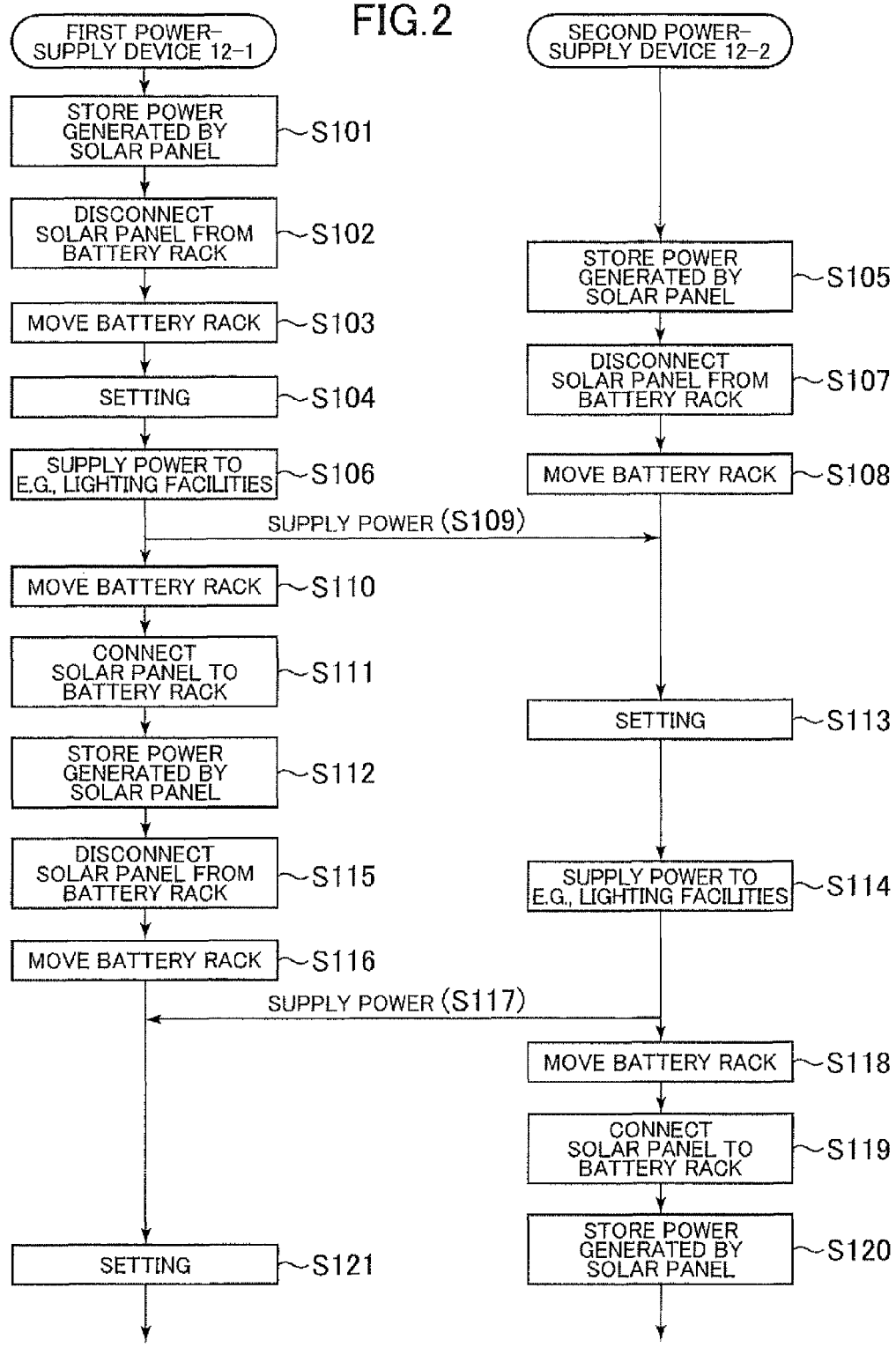

POWER SUPPLY SYSTEM, POWER-SUPPLY DEVICE AND POWER-SUPPLY METHOD

CROSS-REFERENCE TO RELATED APPLICATION

The present application claims priority from Japanese application JP2011-129188 filed on Jun. 9, 2011, the content of which is hereby incorporated by reference into this application.

BACKGROUND OF THE INVENTION

1. Field of the Invention

The present invention relates to a power-supply system, a power-supply device and a power-supply method.

2. Description of the Related Art

Technology related to solar power generation has attracted much attention in recent years. As an example of solar power generation technology, Japanese laid-open patent publication No. 2002-058177 discloses a nighttime power supply apparatus for storing power generated by a solar battery in an electric double-layer capacitor during the daytime to light an LED or the like at night with use of the electric double-layer capacitor as a power supply.

SUMMARY OF THE INVENTION

When a certain amount of power is supplied to a stage set or the like using a power-supply device in which power generated by solar energy is stored, a plurality of power-supply devices are required in a case where sufficient power is not charged in a single power-supply device. However, when a space to install the power-supply device is limited, it is desirable that the number of the power-supply devices to supply power to the stage set or the like is as small as possible.

One or more embodiments of the present invention have been conceived in view of the above, and an object thereof is to allow power-supply devices, in which power generated by solar energy is stored, to exchange power among themselves.

In order to solve the above described problems, a power-supply system according to the embodiment of the present invention includes a plurality of power-supply devices for supplying power externally. The system includes a first power-supply device, which is one of the plurality of the power-supply devices, having a power storage section, and a second power-supply device, which is one of the plurality of power-supply devices and different from the first power-supply device, having a power storage section, wherein the power storage section of the first power-supply device stores power that is generated by a solar panel connected to the first power-supply device and power that is generated by a solar panel connected to the second power-supply device, stored in the power storage section of the second power-supply device, and supplied from the power storage section of the second power-supply device.

A power-supply method according to the embodiment of the present invention includes a generated power storing step of storing power generated by a solar panel connected to a first power-supply device into a power storage section of the first power-supply device, a supplied power storing step of storing power supplied by a second power-supply device, which has a power storage section for storing power generated by a solar panel, into the power storage section of the first power-supply device; and a power supplying step of externally supplying the power stored in the power storage section of the first power-supply device in the generated power storing step and the supplied power storing step.

A power-supply device according to the embodiment of the present invention is a power-supply device that is included in a power-supply system having a plurality of power-supply devices that supply power externally. The system includes a first power-supply device having a power storage section, and a second power-supply device, which is different from the first power-supply device, having a power storage section, the power storage section of the first power-supply device stores power that is generated by a solar panel connected to the first power-supply device and power that is generated by a solar panel connected to the second power-supply device, stored in the power storage section of the second power-supply device, and supplied from the power storage section of the second power-supply device.

According to the embodiment of the present invention, the power storage section of the first power-supply device stores power generated by the solar panel connected to the first power-supply device, and power generated by the solar panel connected to the second power-supply device, stored in the power storage section of the second power-supply device, and supplied from the power storage section of the second power-supply device, thereby allowing the power-supply devices, in which power generated by solar energy is stored, to exchange power among themselves.

According to an embodiment of the present invention, each of the plurality of power-supply devices includes a solar panel and a power storage section, and the power storage section of the first power-supply device, which is one of the plurality of the power-supply devices, stores the power that is generated by the solar panel of the first power-supply device and the power that is generated by the solar panel of the second power-supply device, stored in the power storage section of the second power-supply device, and supplied from the power storage section of the second power-supply device.

According to the embodiment of the present invention, the power storage section of the first power-supply device stores, from the power storage section of the second power-supply device, power that has not been supplied to the external device and remained in the power storage section of the second power-supply device after the second power-supply device supplies power to the external device, a portion of power stored in the external device being supplied from the second power-supply device before the first power-supply device supplying power to the external device.

According to the embodiment of the present invention, the plurality of power-supply devices supply power to a stage set used in a plurality of performances, each of the plurality of power-supply devices includes a storage section for storing power generated by a solar panel, in parallel with setting up the first power-supply device, which is one of the plurality of power-supply devices, so as to supply power to the stage set used in a first performance that is one of the plurality of performances, the power storage section of the second power-supply device, which is one of the plurality of power-supply devices and different from the first power-supply device, stores power generated by the solar panel, at the first performance, the first power-supply device supplies to the stage set a portion of power stored in the power storage section of the first power-supply device, after the first performance ends and before a second performance to be held after the first performance starts, the first power-supply device supplies power remaining in the power storage section of the first power-supply device to the power storage section of the second power-supply device, in parallel with setting up the second power-supply device so as to supply power to the stage set at the second performance, the power storage section of the first power-supply device stores power generated by the solar panel, wherein, at the second performance, the second power-supply device supplies to the stage set a portion of power stored in the power storage section of the second power-supply device, after the second performance ends and before a third performance to be held after the second performance starts, the second power-supply device supplies power remaining in the power storage section of the second power-supply device to the power storage section of the first power-supply device, at the third performance, the first power-supply device supplies to the stage set a portion of power stored in the power storage section of the first power-supply device.

According to the embodiment of the present invention, each of the plurality of power-supply devices includes a solar panel.

According to the embodiment of the present invention, in the supplied power storing step, power that is not supplied externally and remains in the power storage section of the second power-supply device is stored in the power storage section of the first power-supply device.

According to the embodiment of the present invention, after the supplied power storing step, storing power generated by the solar panel connected to the second power-supply device into the power storage section of the second power-supply device, storing, into the power storage section of the second power-supply device, power that is remaining in the power storage section of the first power-supply device and not supplied externally after the power generated by the solar panel connected to the second power-supply device is stored in the power storage section of the second power-supply device, and externally supplying the power stored in the power storage section of the second power-supply device.

According to the embodiment of the present invention, in the power supplying step, after the second power-supply device supplies the power to the external device, the power stored in the power storage section of the first power-supply device is supplied to the external device in which a portion of power stored in the power storage section of the second power-supply device is supplied.

According to the embodiment of the present invention, the power generated by the solar panel is stored in the power storage section outdoors, the power-supply method further includes a step of moving the power-supply device from outdoors to indoors, the power storage section of the power-supply device storing the power generated by the solar panel, and the power stored in the power storage section is externally supplied in an indoor area.

A power-supply method according to the embodiment of the present invention, for using a power-supply system including a plurality of power-supply devices that supply power to a stage set used in a plurality of performances, each of the plurality of power-supply devices having a power storage section for storing power generated by a solar panel, the method includes in parallel with setting up the first power-supply device, which is one of the plurality of power-supply devices, so as to supply power to the stage set used in a first performance that is one of the plurality of performances, storing power generated by the solar panel into the power storage section of the second power-supply device, which is one of the plurality of power-supply devices and different from the first power-supply device, at the first performance, supplying to the stage set a portion of power stored in the power storage section of the first power-supply device, after the first performance ends and before a second performance to be held after the first performance starts, supplying power remaining in the power storage section of the first power-supply device to the power storage section of the second power-supply device, in parallel with setting up the second power-supply device so as to supply power to the stage set at the second performance, storing the power generated by the solar panel into the power storage section of the first power-supply device, at the second performance, supplying to the stage set, using the second power-supply device, a portion of power stored in the power storage section of the second power-supply device, after the second performance ends and before a third performance to be held after the second performance starts, supplying, using the second power-supply device, power remaining in the power storage section of the second power-supply device to the power storage section of the first power-supply device, and at the third performance, supplying to the stage set, using the first power-supply device, a portion of power stored in the power storage section of the first power-supply device.

According to the embodiment of the present invention, the power generated by the solar panel is stored in the power storage section outdoors, the power-supply method further includes a step of moving the power-supply device from outdoors to indoors, the power storage section of the power-supply device storing the power generated by the solar panel, and the power stored in the power storage section is supplied to the stage set in indoor areas.

In some embodiments of this invention, "the second performance" may be held immediately after "the first performance". In some embodiments of this invention, at least one performance may be held between "the first performance" and "the second performance". In some embodiments of this invention, "the third performance" may be held immediately after "the second performance". In some embodiments of this invention, at least one performance may be held between "the second performance" and "the third performance".

BRIEF DESCRIPTION OF THE DRAWINGS

In the accompanying drawings:

FIG. 2 is a flowchart illustrating an example of the process for supplying power to a stage set with the use of a power-supply system according to an embodiment of the present invention.

DETAILED DESCRIPTION OF THE INVENTION

Figure 1:
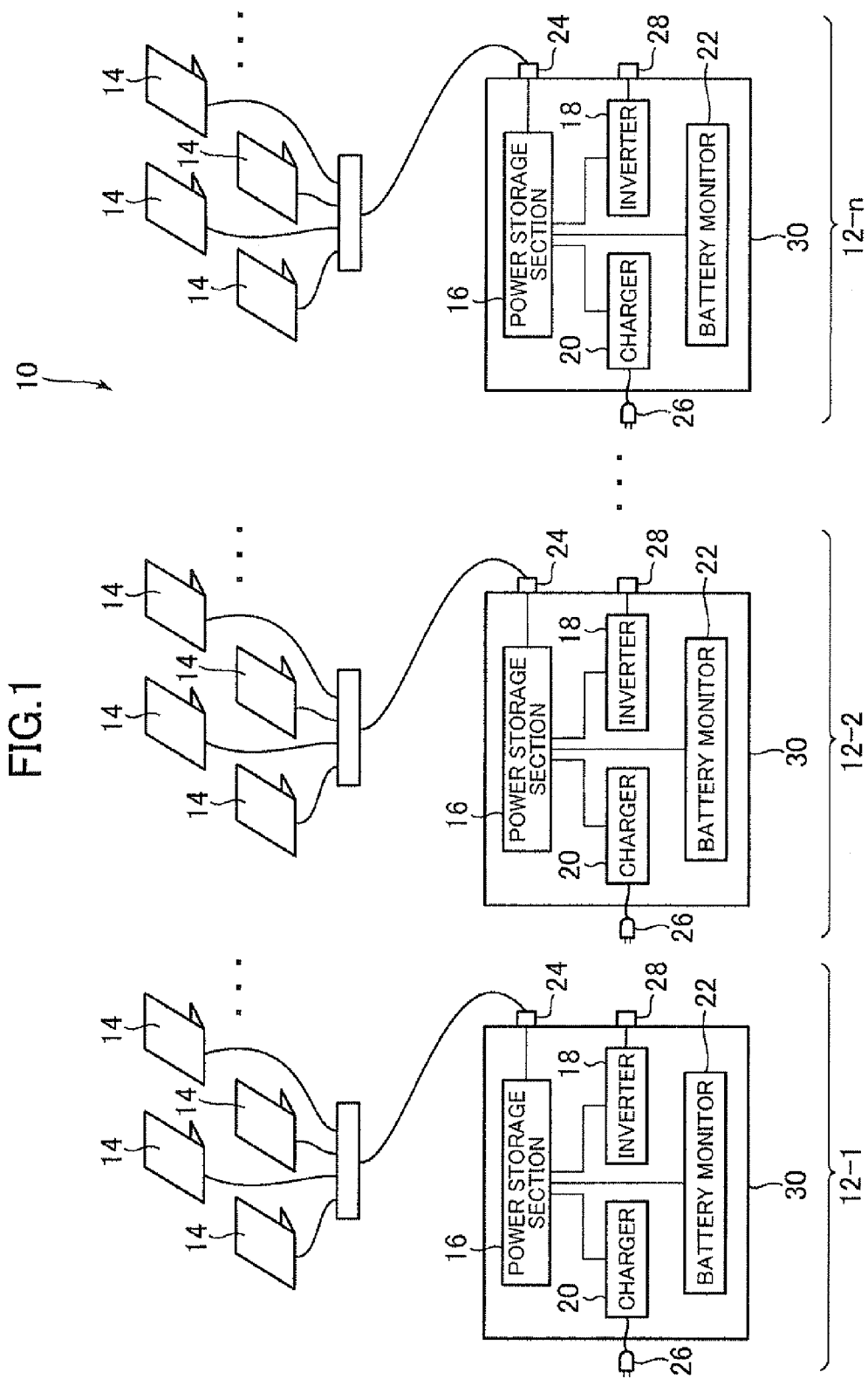
FIG. 1 is a schematic configuration diagram showing an example of a power-supply system according to an embodiment of the present invention.

An embodiment of the present invention will be described below in detail with reference to the accompanying drawings.

FIG. 1 shows a schematic configuration diagram showing an example of a power-supply system 10 according to an embodiment of the present invention. The power-supply system 10 according to this embodiment includes a plurality of connectable power-supply devices 12 (12-1, 12-2, ..., 12-n). Each of the power-supply devices 12 according to this embodiment includes a plurality of solar panels 14, a power storage section 16, an inverter 18, a charger 20, a battery monitor 22, a solar panel connector 24, an attachment plug 26, and a socket 28. In addition, the power-supply device 12 according to this embodiment includes switches for controlling whether to exchange power between the power storage section 16 and an external device.

The solar panel 14 according to this embodiment can be installed with a light receiving surface facing in any direction. Further, the solar panel 14 according to this embodiment is relatively lightweight and easy to move around.

One power-supply device 12 according to this embodiment includes a battery rack 30, which compactly accommodates the power storage section 16, the inverter 18, the charger 20, the battery monitor 22, the solar panel connector 24, the attachment plug 26, and the socket 28. The battery rack 30 according to this embodiment has wheels, such as casters, at the contact surface to the ground, and thus it is readily transportable.

In this embodiment, wires connected to each of a plurality of solar panels 14 of one power-supply device 12 are concentrated to be electrically connected to the power storage section 16 through the solar panel connector 24. Further, in this embodiment, direct-current power generated by the solar panels 14 is stored in the power storage section 16. Further, in this embodiment, the solar panels 14 are removably connected to the battery rack 30 through the solar panel connector 24 so that the solar panels 14 connect to or disconnect from the battery rack 30 in an easy way.

In the power-supply device 12 according to this embodiment, the power storage section 16 and the socket 28 are electrically connected to each other through the inverter 18. When the attachment plug 26 of the device to which the power is supplied is inserted into the socket 28 of the power-supply device 12, and the switch to conduct current is turned to ON, direct-current power stored in the power storage section 16 is converted into alternating-current power by the inverter 18, and then supplied to the connected device through the socket 28.

In this embodiment, the power storage section 16 and the attachment plug 26 are electrically connected to each other through the charger 20. When the attachment plug 26 of the power-supply device 12 is inserted into the socket 28 of the device to which the power is supplied, and the switch to conduct current is turned to ON, alternating-current power supplied by the external device is converted into direct-current power by the charger 20, and then stored in the power storage section 16.

Further, the power-supply device 12 according to this embodiment can store the power supplied by the external device through the attachment plug 26 in the power storage section 16, while storing the power generated by the solar panels 14 in the power storage section 16.

In this embodiment, when a socket 28 of a specific power-supply device (e.g., a first power-supply device 12-1) receives an attachment plug 26 of other power-supply device (e.g., a second power-supply device 12-2), and a switch to conduct current is turned to ON, the power stored in the power storage section 16 of the first power-supply device 12-1 is supplied to the power storage section 16 of the second power-supply device 12-2. Further, the battery rack 30 according to this embodiment has the attachment plug 26 on the surface opposite to the surface where the socket 28 is provided, thereby allowing three or more power-supply devices to readily connect to one another. In addition, in this embodiment, the attachment plug 26 and the socket 28 are placed at almost the same height from the contact surface to the ground. The solar panel connector 24 may also be placed at almost the same height from the contact surface to the ground as the attachment plug 26 and the socket 28.

Further, the battery monitor 22 according to this embodiment has a display to numerically display a power amount stored in the power storage section 16 and the proportion of the stored amount with respect to the capacity of the power storage section 16, thereby allowing a user to externally view the power amount stored in the power storage section 16.

With use of the power-supply system 10 according to this embodiment, for example, at least a portion of the power used in the stage set including lighting facilities used in performances, such as concerts, can be supplied by power generated by solar energy.

In the following, with reference to the flow chart in FIG. 2, there will be described an example of the operation for supplying, over a period of days, power to the stage set including lighting facilities used in nighttime concerts using the power-supply system 10 according to this embodiment.

During the preparation period of a concert, a first power-supply device 12-1 is located at a charging location provided outdoors, and power generated by the solar panels 14 of the first power-supply device 12-1 is stored in a power storage section 16 of the first power-supply device 12-1 (S101). In this embodiment, suppose that power up to 100% of the capacity of the power storage section 16 is stored in the power storage section 16 provided in the first power-supply device 12-1 over a period of days.

Subsequently, the solar panels 14 of the first power-supply device 12-1 are disconnected from the battery rack 30 of the first power-supply device 12-1 (S102). The battery rack 30 of the first power-supply device 12-1 is moved from the charging location to the concert hall (S103). In this embodiment, suppose that the concert hall is located within an indoor space.

Next, the first power-supply device 12-1 is set up to supply power to the lighting facilities or the like in the concert (S104). The attachment plug 26 provided in the lighting facilities or the like is inserted into the socket 28 of the first power-supply device 12-1, the switch to conduct current is turned to ON, and then power stored in the power storage section 16 of the first power-supply device 12-1 is supplied to the stage set such as the lighting facilities.

In parallel with the steps shown in S102 to S104, a second power-supply device 12-2 is located at the charging location, and in the daytime, power generated by the solar panels 14 of the second power-supply device 12-2 is stored in the power storage section of the second power-supply device 12-2 (S105). In this embodiment, suppose that power up to 70% of the capacity of the power storage section 16 is stored in the power storage section 16 of the second power-supply device 12-2.

During a concert held at night time, the first power-supply device 12-1 supplies power to the lighting facilities or the like (S106). In this embodiment, suppose that power of 70% of the capacity of the power storage section 16 of the first power-supply device 12-1 is consumed, and as a result, the amount of power that remains in the power storage section 16 of the first power-supply device 12-1 is 30% of the capacity. In parallel with the step shown in S106, and before the concert ends, the solar panels 14 of the second power-supply device 12-2 are disconnected from the battery rack 30 of the second power-supply device 12 (S107), and the battery rack 30 of the second power-supply device 12-2 is moved from the charging location to the concert hall (S108).

After the concert, the attachment plug 26 of the second power-supply device 12-2 is inserted into the socket 28 of the first power-supply device 12-1, the switch to conduct current is turned to ON, and then power is supplied from the power storage section 16 of the first power-supply device 12-1 to the power storage section 16 of the second power-supply device 12-2 (S109). With this, the power stored in the power storage section 16 of the first power-supply device 12-1 is lost, and power of 100% of the capacity of the power storage section 16 of the second power-supply device 12-2 is stored in the power storage section 16.

Subsequently, the battery rack 30 of the first power-supply device 12-1 is moved from the concert hall to the charging location (S110). The solar panels 14 of the first power-supply device 12-1 then connect to the battery rack 30 of the first power-supply device 12-1 (S111). During the daytime of the day following the concert indicated in S106, power generated by the solar panels 14 of the first power-supply device 12-1 is stored in the power storage section 16 of the first power-supply device 12-1 (S112). In this embodiment, power up to 70% of the capacity of the power storage section 16 is stored in the power storage section 16 of the first power-supply device 12-1. In parallel with the steps shown in S110 to S112, a setting is made so that the second power-supply device 12-2 can supply power to the lighting facilities or the like (S113).

During the concert held on the night of the same day, the second power-supply device 12-2 supplies power to the lighting facilities or the like (S114). In this embodiment, suppose that power of 70% of the capacity of the power storage section 16 of the first power-supply device 12-1 is consumed, and as a result, the amount of power that remains in the power storage section 16 of the first power-supply device 12-1 is 30% of the capacity. In parallel with the step shown in S114, and before the concert ends, the solar panels 14 of the first power-supply device 12-1 are disconnected from the battery rack 30 of the first power-supply device 12-1 (S115), and the battery rack 30 of the first power-supply device 12-2 is moved from the charging location to the concert hall (S116).

After the concert, the attachment plug 26 of the first power-supply device 12-1 is inserted into the socket 28 of the second power-supply device 12-2, the switch to conduct current is turned to ON, and then power is supplied from the power storage section 16 of the second power-supply device 12-2 to the power storage section 16 of the first power-supply device 12-1 (S117). With this, the power stored in the power storage section 16 of the second power-supply device 12-2 is lost, and power of 100% of the capacity of the power storage section 16 of the first power-supply device 12-1 is stored in the power storage section 16.

Subsequently, the battery rack 30 of the second power-supply device 12-2 is moved from the concert hall to the charging location (S118). The solar panels 14 of the second power-supply device 12-2 then connect to the battery rack 30 of the second power-supply device 12-2 (S119). During the daytime of the day following the concert indicated in S114, power generated by the solar panels 14 of the second power-supply device 12-2 is stored in the power storage section 16 provided in the second power-supply device 12-2 (S120). In this embodiment, power up to 70% of the capacity of the power storage section 16 is stored in the power storage section 16 of the second power-supply device 12-2. In parallel with the steps shown in S118 to S120, a setting is made so that the first power-supply device 12-1 can supply power to the lighting facilities or the like (S121).

Similar steps as shown in S106 through S121 are repeatedly executed so that the power-supply system 10 according to this embodiment supplies power to the stage set used in concerts over a period of days.

In the above example, after solar panels 14 connected to a power-supply device 12 supply power to a power storage section 16, other power-supply devices 12 additionally supply power to that power-supply device 12. In this regard, after other power-supply devices 12 supply power to that power-supply device 12, the solar panels 14 connected to that power-supply device 12 may additionally supply power to the power storage section 16.

A power storage section 16 provided in a power-supply device 12 according to this embodiment includes six 12-volt lead storage batteries. Note that a storage battery included in the power storage section 16 may be any kind of battery. For example, the power storage section 16 may include a lithium-ion secondary battery. In the power storage section 16, three units each having two storage batteries connected in series are connected in parallel in three lines. Accordingly, the power storage section 16 according to this embodiment has a voltage of 24 volts. Further, in this embodiment, each storage battery has a capacity of 150 ampere-hours. Accordingly, the capacity of the entire power storage section 16 is, when calculated in terms of 100 volts, 108 ampere-hours. In other words, the amount of power storable in the entire power storage section 16 is 10.8 kilowatt-hours of power. The power stored in the power storage section 16 is supplied to other devices through the inverter 18 as 100-volt alternating-current power.

In this embodiment, the amount of power supplied from a power-supply device 12 to other power-supply device 12 per unit of time is smaller than the amount of power supplied from the power-supply device 12 to the stage set or the like per unit of time. Further, in this embodiment, a single period of time for supplying power from a power-supply device 12 to another power-supply device 12 is longer than a single period of time for supplying power from the power-supply device 12 to the stage set or the like. In view of the efficiency of the inverter 18 or using the power-supply system 10 according to this embodiment so as to supply stable power for a concert or the like for about five hours, for a device which requires a large amount of power, for example, a device used in performances such as a concert, the power-supply device 12 can stably supply about 75% of the entire capacity of the power storage section 16, which is about 8.0 kilowatt hours. The rest of the power, which is more than 2.0 kilowatt hours of power, is supplied to the power storage section 16 of other power-supply device 12 by long duration low-power output. In this way, in the power-supply system 10 according to this embodiment, a power-supply device 12 supplies power to a device which requires high power, and subsequently, the rest of the power stored in the power-supply device 12 is supplied to another power-supply device 12, thereby enabling effective use of power generated by solar energy.

Further, power-generating capacity of a solar panel 14 according to this embodiment is 190 watts, and 10 solar panels 14 are connected to a power-supply device 12. Accordingly, a maximum of 1.9-kilowatts of power generated by the solar panels 14 is supplied to the power storage section 16 of the battery rack 30. It is expected that power of 80% of full capacity is generated on a sunny day, and thus when it is sunny all day, it may be possible to generate enough power to fully charge a power storage section 16 of one power-supply device 12.

On the other hand, there may be a case where a power storage section 16 of one power-supply device 12 is not fully charged for one day when it is cloudy all day, for example. In this case, in the power-supply system 10 according to this embodiment, a power storage section 16 of one power-supply device 12 can be fully charged by being powered by another power-supply device 12 used in the concert on the previous day, or, while solar panels 14 of a plurality of power-supply devices 12 generate power in parallel, concentrating power generated by the solar panels 14 and stored in the power storage section 16 into the power storage section 16 of one power-supply device 12.

The present invention is not to be limited to the above described embodiment.

For example, one power-supply device 12 may include a plurality of chargers 20 so that one power-supply device 12 may be powered by each power storage section 16 of a plurality of power-supply devices 12 in parallel.

Further, a set of a plurality of solar panels 14 may be used specifically for a corresponding power-supply device 12. Alternatively, it is possible to change the power-supply device 12 connected to the set of solar panels as needed.

Further, it is possible to have an arrangement where the set of solar panels 14 are accommodated in the battery rack 30 and not removably connected to the battery rack 30, and moved with the battery rack 30 as a unit. In addition, when the solar panels 14 generate power, Maximum Power Point Tracking control (MPPT control) may be performed.

In the above, specific numeric values are exemplary, and the present invention is not limited to these values.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A power-supply system comprising:
    a first power-supply device which supplies power externally and includes a first power storage section; and
    a second power-supply device which supplies power externally and includes a second power storage section, wherein
    the first power-supply device and the second power-supply device, both of which supply power to a stage set used in a first performance, a second performance, and a third performance, and wherein
    in parallel with setting up the first power-supply device so as to supply power to the stage set used in the first performance, the second power storage section stores power generated by the solar panel connected to the second power-supply device, and wherein
    at the first performance, the first power-supply device supplies to the stage set a portion of power stored in the first power storage section, and wherein
    after the first performance ends and before the second performance to be held after the first performance starts, the first power-supply device supplies power remaining in the first power storage section to the second power storage section, and wherein
    in parallel with setting up the second power-supply device so as to supply power to the stage set at the second performance, the first power storage section stores power generated by the solar panel connected to the first power-supply device, and wherein
    at the second performance, the second power-supply device supplies to the stage set a portion of power stored in the second power storage section, and wherein
    after the second performance ends and before the third performance to be held after the second performance starts, the second power-supply device supplies power remaining in the second power storage section to the first power storage section, and wherein
    at the third performance, the first power-supply device supplies to the stage set power stored in the first power storage section.

2. The power-supply system according to claim 1, further comprising:
    a first solar panel connected to the first power-supply device, and
    a second solar panel connected to the second power-supply device.

3. A power-supply method for using a power-supply system including a plurality of power-supply devices that supply power to a stage set used in a plurality of performances, each of the plurality of power-supply devices having a power storage section for storing power generated by a solar panel, the method comprising:
    in parallel with setting up the first power-supply device, which is one of the plurality of power-supply devices, so as to supply power to the stage set used in a first performance that is one of the plurality of performances, storing power generated by the solar panel into the power storage section of the second power-supply device, which is one of the plurality of power-supply devices and different from the first power-supply device;
    at the first performance, supplying to the stage set a portion of power stored in the power storage section of the first power-supply device;
    after the first performance ends and before a second performance to be held after the first performance starts, supplying power remaining in the power storage section of the first power-supply device to the power storage section of the second power-supply device;
    in parallel with setting up the second power-supply device so as to supply power to the stage set at the second performance, storing the power generated by the solar panel into the power storage section of the first power-supply device,
    at the second performance, supplying to the stage set, using the second power-supply device, a portion of power stored in the power storage section of the second power-supply device;
    after the second performance ends and before a third performance to be held after the second performance starts, supplying, using the second power-supply device, power remaining in the power storage section of the second power-supply device to the power storage section of the first power-supply device; and
    at the third performance, supplying to the stage set, using the first power-supply device, a portion of power stored in the power storage section of the first power-supply device.

4. The power-supply method according to claim 3,
    wherein the power generated by the solar panel is stored in the power storage section outdoors,
    and wherein the power-supply method further comprises a step of moving the power-supply device from outdoors to indoors, the power storage section of the power-supply device storing the power generated by the solar panel,
    and wherein the power stored in the power storage section is supplied to the stage set in indoor areas.

* * * * *